(12) United States Patent
Yoon et al.

(10) Patent No.: US 12,450,745 B2
(45) Date of Patent: Oct. 21, 2025

(54) SELECTION OF FREQUENCY OFFSET FOR AN MRI SCAN

(71) Applicant: Siemens Healthineers AG, Forchheim (DE)

(72) Inventors: Seung Su Yoon, Erlangen (DE); Jens Wetzl, Erlangen (DE); Fasil Gadjimuradov, Erlangen (DE); Michaela Schmidt, Uttenreuth (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 359 days.

(21) Appl. No.: 18/311,339

(22) Filed: May 3, 2023

(65) Prior Publication Data

US 2023/0360215 A1 Nov. 9, 2023

(30) Foreign Application Priority Data

May 5, 2022 (EP) .................................... 22171819

(51) Int. Cl.
G06K 9/00 (2022.01)
G01R 33/565 (2006.01)
(Continued)

(52) U.S. Cl.
CPC .......... *G06T 7/0014* (2013.01); *G01R 33/565* (2013.01); *G06T 5/20* (2013.01);
(Continued)

(58) Field of Classification Search
CPC .......... G06T 7/0014; G06T 5/20; G06T 5/50; G06T 7/11; G06T 2207/10088;
(Continued)

(56) References Cited

U.S. PATENT DOCUMENTS 5,309,102 A * 5/1994 Deckard .............. G01R 33/583
324/313
8,085,045 B2 * 12/2011 Greiser ................ G01R 33/543
324/309
(Continued)

FOREIGN PATENT DOCUMENTS

WO WO-2016186644 A1 * 11/2016 ............. A61B 5/055

OTHER PUBLICATIONS

S Yoon, F Gadjimuradov, M Schmidt, J Wetzl, A Maier, Fully automated machine learning-based selection of optimal bSSFP frequency offset for artifact reduction in cardiac MRI, European Heart Journal—Cardiovascular Imaging, vol. 23, Issue Supplement_ 2, Sep. 2022, jeac141.016, https://doi.org/10.1093/ehjci/jeac141.016.

(Continued)

Primary Examiner — Shervin K Nakhjavan
(74) Attorney, Agent, or Firm — Harness, Dickey & Pierce, P.L.C.

(57) ABSTRACT

A frequency offset is selected based on similarity measures of multiple MRI images obtained from frequency scout measurements associated with multiple frequency offsets from a reference frequency of a magnetization excitation pulse. The similarity measure for each respective MRI image of the multiple MRI images is determined based on a comparison between at least one reference image and the respective MRI image. The at least one reference image is determined from the multiple MRI images based on spectrum information of each of the multiple MRI images. Such methods facilitate automatically determining/selecting a more optimal frequency offset for an MRI scan following a frequency scout scan, in particular, for an SSFP or a bSSFP pulse sequence, and thereby banding artifacts and/or flow-related artifacts can be reduced for the MRI scan.

20 Claims, 2 Drawing Sheets

(51) Int. Cl.
*G06T 5/20* (2006.01)
*G06T 5/50* (2006.01)
*G06T 7/00* (2017.01)
*G06T 7/11* (2017.01)

(52) U.S. Cl.
CPC .................. *G06T 5/50* (2013.01); *G06T 7/11* (2017.01); *G06T 2207/10088* (2013.01); *G06T 2207/20081* (2013.01); *G06T 2207/20216* (2013.01); *G06T 2207/30044* (2013.01); *G06T 2207/30048* (2013.01)

(58) Field of Classification Search
CPC . G06T 2207/20081; G06T 2207/20216; G06T 2207/30044; G06T 2207/30048; G01R 33/565; G01R 33/546; G01R 33/5608; G01R 33/5613; G01R 33/5614; G01R 33/56563; G01R 33/543
See application file for complete search history.

(56) References Cited

U.S. PATENT DOCUMENTS

| | | | | |
|---|---|---|---|---|
| 9,971,009 | B2* | 5/2018 | Griswold | G01R 33/56536 |
| 10,909,681 | B2* | 2/2021 | Hsiao | G06V 10/82 |
| 2005/0165295 | A1* | 7/2005 | Li | G01R 33/56 |
| | | | | 600/413 |

OTHER PUBLICATIONS

Yu-Wei Tang et al: "Fast and fully automatic calibration of frequency offset for balanced steady-state free precession cardiovascular magnetic resonance at 3.0 Tesla"; Journal of Cardiovascular Magnetic Resonance, Biomed Central Ltd, London UK, vol. 15, No. 1; Apr. 11, 2013.

Gadjimuradov Fasil et al.:"Deep learning-guided weighted averaging for signal dropout compensation in diffusion-weighted imaging of the liver", arXiv 2022.

Schär, Michael et. al.; "Cardiac SSFP Imaging at 3 Tesla"; in Magnetic Resonance in Medicine; vol. 51; pp. 799-806; (2004) 2004.

Bieri, Oliver et al. "Fundamentals of Balanced Steady State Free Precession MRI"; in: Journal of Magnetic Resonance Imaging; vol. 38; pp. 2-11; 2013 // DOI: 10.1002/jmri.24163.

Deshpande V. et al.: "Artifact Reduction in True-FISP Imaging of the Coronary Arteries by Adjusting Imaging Frequency"; Magnetic Resonance in Medicine 2003, vol. 49, p. 803-809; Jul. 10, 2003; 2003.

Zhou Wang et al.: "Bovik, A.C.; Sheikh, H.R.; Simoncelli, E.P. Image quality assessment: from error visibility to structural similarity", IEEE Transactions on Image Processing, vol. 13 No. 4, p. 600-612, Apr. 2004; 2004.

* cited by examiner

SELECTION OF FREQUENCY OFFSET FOR AN MRI SCAN

CROSS-REFERENCE TO RELATED APPLICATION(S)

The present application claims priority under 35 U.S.C. § 119 to European Patent Application No. 22171819.0, filed May 5, 2022, the entire contents of which are incorporated herein by reference.

TECHNICAL FIELD

Various examples of the present invention generally relate to magnetic resonance (MR) imaging (MRI). Various examples specifically relate to selecting a frequency offset for an MRI scan to reduce artifacts, e.g., banding artifacts and/or flow-related artifacts.

BACKGROUND

In balanced steady-state free precession (balanced SSFP or bSSFP) pulse sequences commonly used for cardiac MRI, signal modulation, e.g., banding or flow-related artifacts, due to inhomogeneity of the main magnetic field are frequently observed, especially at higher main magnetic field strengths, e.g., 3 Tesla (T), 7 T, and even 9 T. The spatial position of these artifacts can be shifted by using a magnetization excitation pulse (or simply excitation pulse) with a frequency offset from the Larmor frequency to reduce artifacts in a region of interest (ROI), e.g., the heart or another region under investigation. I.e., the actual frequency of the magnetization excitation pulse is offset from the Larmor frequency by a frequency offset.

In clinical practice, frequency scout (FS) measurements are acquired to scan the possible frequency offsets and enable visual selection the optimal frequency offset through visual inspection of FS images. The frequency offset within an FS scan of an FS measurement that has the least artifacts in the ROI is selected by a medical expert. Afterwards, the selected frequency offset is transferred to the acquisition protocol and is used for bSSFP acquisition.

Non-patent literature—Schär, Michael, et al. "Cardiac SSFP imaging at 3 Tesla." Magnetic Resonance in Medicine: An Official Journal of the International Society for Magnetic Resonance in Medicine 51.4 (2004): 799-806.—discloses a sequence protocol for cardiac SSFP imaging at 3.0T, taking into account several partly adverse effects at higher field, such as increased field inhomogeneities, longer T1, and power deposition limitations.

Non-patent literature—Deshpande, Vibhas S., Steven M. Shea, and Debiao Li. "Artifact reduction in true-FISP imaging of the coronary arteries by adjusting imaging frequency." Magnetic Resonance in Medicine: An Official Journal of the International Society for Magnetic Resonance in Medicine 49.5 (2003): 803-809.—discloses a scouting method for estimating an optimal synthesizer frequency for a volume of interest and a similar scouting method for determining the optimal frequency offset for fat saturation pulse.

Coronary artery imaging was performed in healthy subjects using a 3D fast imaging with steady-state precession sequence to validate the effectiveness of the frequency corrections. Substantial reduction in image artifacts and improvement in fat suppression were observed by using the water and fat frequencies estimated by the scouting scans.

In existing selection procedure of the frequency offset, the medical expert has to check frame-by-frame where the artifacts occur with respect to the ROI. This process needs expertise, is time-consuming and therefore expensive as well as also prone to errors.

SUMMARY

Therefore, a need exists for advanced techniques of performing MRI, in particular, MRI using SSFP or bSSFP pulse sequences. More specifically, a need exists for techniques of reducing artifacts, e.g., banding artifacts and/or flow-related artifacts, when performing MRI.

At least this need is met by the features of embodiments described herein and the independent claims. The features of the dependent claims further define embodiments.

According to examples disclosed herein, methods, computing devices, and MRI scanners for selecting a frequency offset for an MRI scan are disclosed. Such methods facilitate automatically determining/selecting an optimal frequency offset for an MRI scan following a frequency scout scan, in particular, for an SSFP or a bSSFP pulse sequence. By using the determined/selected optimal frequency offset, banding artifacts and/or flow-related artifacts can be reduced.

A computer-implemented method is provided. The method comprises obtaining multiple MRI images. The multiple MRI images are obtained from frequency scout measurements associated with multiple frequency offsets from a reference frequency of a magnetization excitation pulse. The method further comprises determining from the multiple MRI images, at least one reference image based on spectrum information of each of the multiple MRI images. The method still further comprises determining, for each one of the multiple MRI images, a respective similarity measure based on a comparison between the at least one reference image and the respective MRI image, and selecting, based on the similarity measures, a frequency offset for a subsequent MRI scan from the multiple frequency offsets.

A computer program or a computer-program product or a computer-readable storage medium that includes program code is provided. The program code can be loaded and executed by at least one processor. Upon loading and executing the program code, the at least one processor performs a method. The method comprises obtaining multiple MRI images. The multiple MRI images are obtained from frequency scout measurements associated with multiple frequency offsets from a reference frequency of a magnetization excitation pulse. The method further comprises determining from the multiple MRI images, at least one reference image based on spectrum information of each of the multiple MRI images. The method still further comprises determining, for each one of the multiple MRI images, a respective similarity measure based on a comparison between the at least one reference image and the respective MRI image, and selecting, based on the similarity measures, a frequency offset for a subsequent MRI scan from the multiple frequency offsets.

A computing device is provided. The computing device comprises a processor and a memory. The processor is configured to load program code from the memory and execute the program code. Upon executing the program code, the processor is configured to obtain multiple MRI images. The multiple MRI images are obtained from frequency scout measurements associated with multiple frequency offsets from a reference frequency of a magnetization excitation pulse. The processor is further configured to determine from the multiple MRI images, at least one reference image based on spectrum information of each of the multiple MRI images. The processor is still further configured to determine, for each one of the multiple MRI images, a respective similarity measure based on a comparison between the at least one reference image and the respective MRI image, and select, based on the similarity measures, a frequency offset for a subsequent MRI scan from the multiple frequency offsets.

An MRI scanner is provided. The MRI scanner comprises the computing device described above.

It is to be understood that the features mentioned above and those yet to be explained below may be used not only in the respective combinations indicated, but also in other combinations or in isolation without departing from the scope of the present invention.

DETAILED DESCRIPTION

Figure 1:
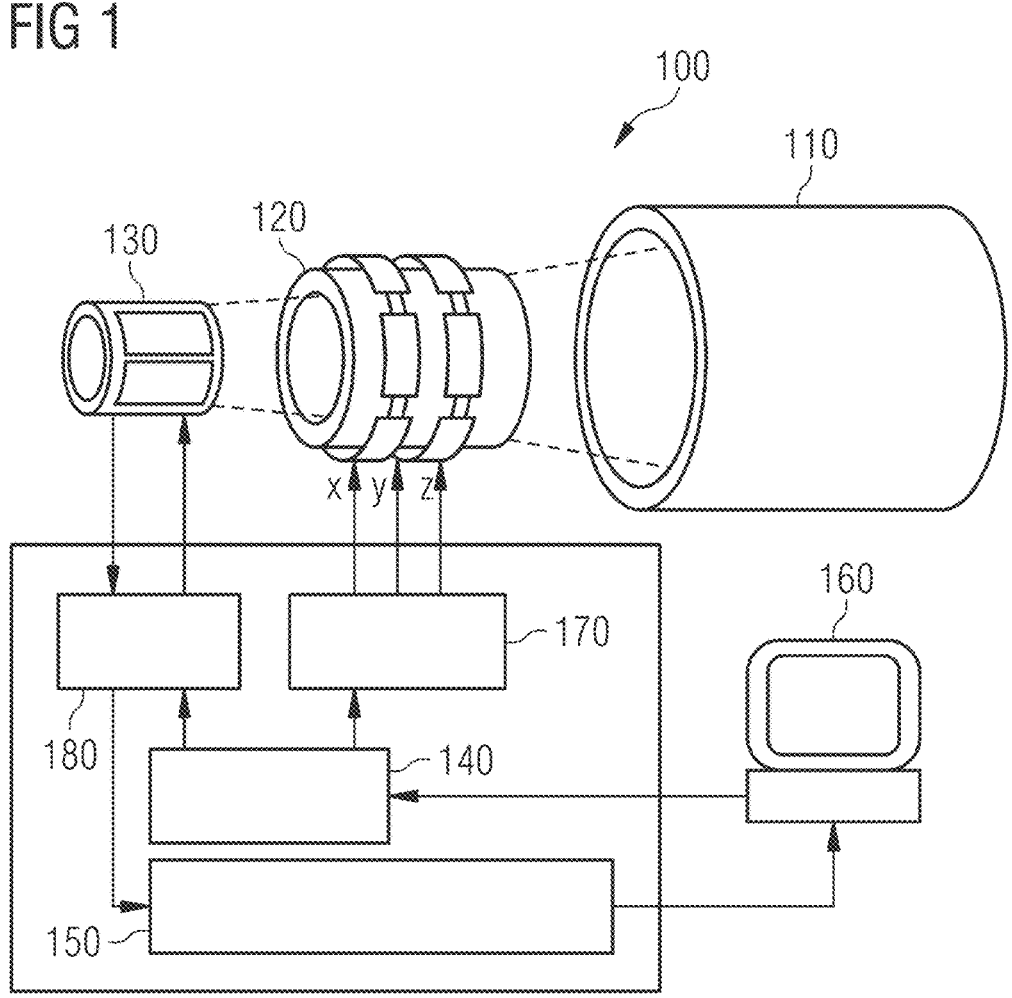
FIG. 1 schematically illustrates an MRI scanner according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the present invention will be described in detail with reference to the accompanying drawings. It is to be understood that the following description of embodiments is not to be taken in a limiting sense. The scope of the present invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of MRI are described. MRI may be employed to obtain raw MR signals of a magnetization of nuclear spins of a sample region of the patient (MRI data). The sample region defines a field of view (FOV). The FOV typically includes a smaller region of interest (ROI) and surrounding tissue or background. The MRI data are defined in k-space. Based on the MRI data, MRI images in either k-space or spatial domain can be determined.

As a general rule, the term MRI image used herein denotes a 2-D or 3-D spatial dataset. This can be obtained, e.g., from reconstruction of MR data using techniques known to the skilled person.

According to various examples, SSFP or bSSFP pulse sequences may be employed for acquiring MRI data. The bSSFP pulse sequence has become a major imaging method in clinical practice, such as cardiovascular magnetic resonance because of advantages of sub second scan time, high fluid-tissue contrast, and three-dimensional imaging compatibility.

In general, SSFP MRI sequences are based on a low flip angle gradient echo MRI sequence with a short repetition time, to provide time resolution. The repetition time—typically fixed—can be smaller than the transverse relaxation time of the magnetization. I.e., a spin echo of a next RF pulse can be located within the free-induction decay of the magnetization of a preceding RF pulse. Thus, a sequence of RF pulses is used. This generates a signal of time-varying amplitude. Different magnetization steady states can be generated, depending on the used gradient fields. bSSFP MRI sequences are a specific form of SSFP MRI sequences, where each gradient pulse within a repetition time (TR) is compensated with another gradient pulse of opposite polarity to avoid any dephasing due to gradient switching. Details of the SSFP MRI sequences are disclosed in Bieri, Oliver, and Klaus Scheffler. "Fundamentals of balanced steady state free precession MRI." Journal of Magnetic Resonance Imaging 38.1 (2013): 2-11.

To facilitate the utilization of SSFP pulse sequences, frequency scout measurements can be used to identify the optimum frequency offset associated with the SSFP pulse sequence, which may minimize the presence of artifacts in the MRI images, e.g., artifacts arising because of global heterogeneity of the main magnetic field. The frequency scout is a discrete search approach. It acquires SSFP images with varying frequency offsets of the excitation pulse with respect to a reference frequency.

According to this disclosure, during a frequency scout scan, frequency scout measurements associated with multiple frequency offsets from a reference frequency of a magnetization excitation pulse, e.g., the Larmor frequency, is obtained, and thereby multiple MRI images are obtained from the frequency scout measurements. At least one reference image is determined from the multiple MRI images based on spectrum information of each of the multiple MRI images, and a respective similarity measure is determined based on a comparison between the at least one reference image and each one of the multiple MRI images. Then, a frequency offset for a subsequent MRI scan from the multiple frequency offsets is selected based on the similarity measures. According to the disclosure, the MRI scan may then be executed using the selected frequency offset.

By selecting the frequency offset for a subsequent MRI scan from the multiple frequency offsets based on the similarity measures which respectively characterize how similar each one of the multiple MRI images is to the at least one reference image, the optimal offset for a subsequent MRI scan can be selected. Such a selection can be automatically performed using a computing device, such as a personal computer, a server, a workstation, etc. Thus, the number of frequency offsets per hertz (Hz) used in the frequency scout measurement may be increased, and thereby the optimal frequency offset can be determined more precisely, reliably, and efficiently compared to being manually selected by a medical expert. Human error may be reduced.

FIG. 1 illustrates aspects with respect to an MRI scanner 100. The MRI scanner 100 can be used to perform the frequency scout measurement and the subsequent MRI scan using the frequency offset determined/selected based on the frequency scout measurement. There are several principal components constituting an MRI scanner 100: the main magnet 110; a set of gradient coils 120 to provide switchable spatial gradients in the main magnetic field; radio frequency (RF) coils 130 (or resonators) for the transmission and reception of radio frequency pulses; pulse sequence electronics 140 for programming the timing of transmission signals (excitation pulse, gradient signals); image reconstruction electronics 150 and a human machine interface 160 for viewing, manipulating, and storing images.

A common type of the main magnet 110 used in MRI systems is the cylindrical superconducting magnet (typically with a 1 meter bore size). The main magnet 110 can provide a main magnet field with a field strength varying from 0.5 T (21 MHz) to 3.0 T (128 MHz), even 9 T (383 MHz), along its longitudinal axis. The main magnetic field can align the magnetization of the nuclear spins of a patient along the longitudinal axis. The patient can be moved into the bore by a sliding table (not shown in FIG. 1).

Typically, the main magnetic field exhibits inhomogeneities, i.e., local deviations from the nominal value. These are due to magnetic materials, non-perfect coils, etc. The inhomogeneities can lead to artifacts, specifically in SSFP measurements. Techniques are disclosed that facilitate reducing such artifacts.

The gradient coils 120 fit inside the bore of the main magnet 110 (after any active shimming coils, if present). The function of the gradient coils 120 is to provide a temporary change in the magnitude of the main magnetic field as a function of position in the bore of the main magnet 110. The gradient coils 120 provide a spatial encoding of the magnetic field strength, to thereby choose slices of the patient body for selective imaging. In this way, MRI can be tomographic— i.e., it can image slices. The gradient coils 120 also provide the mechanism and/or means to spatially encode the voxels within a given image slice so that the individual echoes coming from each voxel can be discriminated and turned into an MR image. There are usually three orthogonal gradient coils, one for each of the physical x, y, and z directions. The gradients can be used for slice selection (slice-selection gradients), frequency encoding (readout gradients), and phase encoding along one or more phase-encoding directions (phase-encoding gradients). Hereinafter, the slice-selection direction will be defined as being aligned along the Z-axis; the readout direction will be defined as being aligned with the X-axis; and a first phase-encoding direction as being aligned with the Y-axis. A second phase-encoding direction may be aligned with the Z-axis. The directions along which the various gradients are applied are not necessarily in parallel with the axes defined by the gradient coils 120. Rather, it is possible that these directions are defined by a certain k-space trajectory which, in turn, can be defined by certain requirements of the respective MRI pulse sequence and/or based on anatomic properties of a patient. The gradient coils 120 usually coupled with the pulse sequence electronics 140 via gradient amplifiers 170.

RF pulses that are oscillating at the Larmor frequency (or Larmor frequency+frequency offset) applied around a sample causes nuclear spins to precess, tipping them toward the transverse plane. Once a spin system is excited, coherently rotating spins can induce RF currents (at the Larmor frequency or Larmor frequency+frequency offset) in nearby antennas, yielding measurable signals associated with the free induction decay and echoes. Thus, the RF coils 130 serve to both induce spin precession and to detect signals indicative of the precession of the nuclear spins. The RF coils 130 usually coupled with both the pulse sequence electronics 140 and the image reconstruction electronics 150 via RF electronics 180, respectively.

For creating such RF pulses, an RF transmitter (e.g., a part of the RF electronics 180) is connected via an RF switch (e.g., a part of the RF electronics 180) with the RF coils 130. Via an RF receiver (e.g., a part of the RF electronics 180), it is possible to detect the induced currents or signals by the spin system. In particular, it is possible to detect echoes; echoes may be formed by applying one or more RF pulses (spin echo) and/or by applying one or more gradients (gradient echo). The respectively induced currents or signals can correspond to raw MRI data in k-space; according to various examples, the MRI data can be processed using reconstruction techniques in order to obtain MRI images.

The human machine interface 160 might include at least one of a screen, a keyboard, a mouse, etc. Via the human machine interface 160, a user input can be detected and output to the user can be implemented. For example, via the human machine interface 160, it is possible to select and configure the scanning pulse sequence, e.g., an SSFP pulse sequence, graphically select the orientation of the scan planes to image, review images obtained, and change variables in the pulse sequence to modify the contrast between tissues. The human machine interface 160 is respectively connected to the pulse sequence electronics 140 and the image reconstruction electronics 150, such as an array processor, which performs the image reconstruction.

The pulse sequence electronics 140 may include a GPU and/or a CPU and/or an application-specific integrated circuit and/or a field-programmable array. The pulse sequence electronics 140 may implement various control functionality with respect to the operation of the MRI scanner 100, e.g. based on program code loaded from a memory. For example, the pulse sequence electronics 140 could implement a sequence control for time-synchronized operation of the gradient coils 120, both the RF transmitter and the RF receiver of the RF electronics 180.

The image reconstruction electronics 150 may include a GPU and/or a CPU and/or an application-specific integrated circuit and/or a field-programmable array. The image reconstruction electronics 150 can be configured to implement post-processing for reconstruction of MRI images.

The pulse sequence electronics 140 and the image reconstruction electronics 150 may be a single circuit, or two separate circuits.

The MRI scanner 100 may be connectable to a database (not shown in FIG. 1), such as a picture archiving and communication system (PACS) located within a local network of a hospital, for storing acquired MRI data, and/or, MRI images in k-space, and reconstructed MRI images in spatial domain.

According to this disclosure, the pulse sequence electronics 140 of the MRI scanner 100 can be configured/programmed according to techniques disclosed hereinafter to control the RF coils 130 via the RF electronics 180 to generate a magnetization excitation pulse with an optimal frequency, e.g., the Larmor frequency+an optimal frequency offset. Therefore, artifacts, particularly due to inhomogeneity of the main magnetic field can be precisely reduced.

Details with respect to techniques, such as the functioning of the MRI scanner 100, particularly the functioning of the pulse sequence electronics 140 and/or the image reconstruction electronics 150 are described in connection with FIG. 2.

Figure 2:
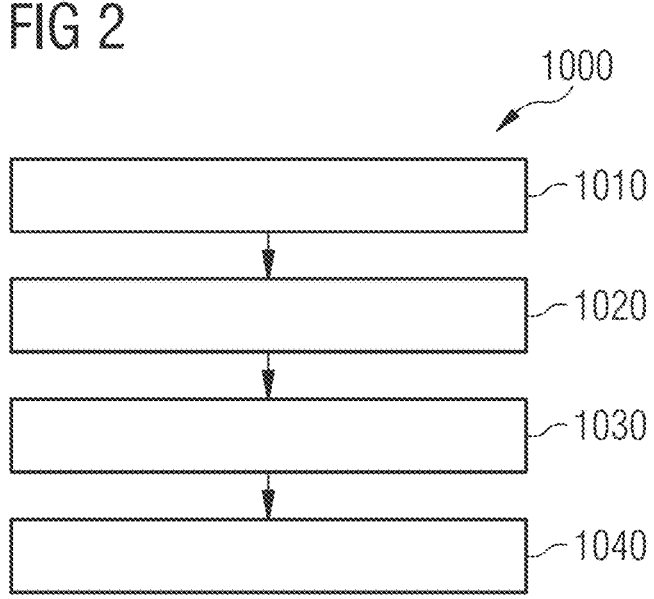
FIG. 2 schematically illustrates a flowchart of a method according to various examples.

FIG. 2 is a flowchart of a method 1000 according to various examples. For example, the method 1000 according to FIG. 2 may be executed by either the image reconstruction electronics 150 or the pulse sequence electronics 140 of the MRI scanner 100 according to the example of FIG. 1, e.g., upon loading program code from a memory. The method 1000 may be executed by the image reconstruction electronics 150 together with the pulse sequence electronics 140, for example, the image reconstruction electronics 150 may be configured to process MRI images and the pulse sequence electronics 140 may be configured to generate an acquisition protocol, e.g., the SSFP pulse sequences. It would also be possible that the method 1000 is at least partially executed by a separate compute unit, e.g., at a server backend.

FIG. 2 illustrates aspects with respect to selecting, based on frequency scout measurements obtained during a frequency scout scan, a frequency offset from a reference frequency of a magnetization excitation pulse for a subsequent MRI scan. During the frequency scout scan, the frequency scout measurements associated with multiple frequency offsets from a reference frequency of a magnetization excitation pulse, e.g., the Larmor frequency, are obtained, and thereby multiple MRI images, e.g., either in k-space or spatial domain, are obtained from the frequency scout measurements.

Each MRI image is associated with a respective frequency offset. Different MRI images show smaller or larger artifacts in a ROI, due to the different frequency offsets. To determine which MRI images show larger or smaller artifacts in the ROI at least one reference image is determined from the multiple MRI images based on spectrum information of each of the multiple MRI images, and a respective similarity measure is determined based on a comparison between the at least one reference image and each one of the multiple MRI images. Then, a frequency offset for a subsequent MRI scan from the multiple frequency offsets is selected based on the similarity measures. Details of the method 1000 are described below.

At block 1010, multiple MRI images are obtained and the multiple MRI images are obtained from frequency scout measurements associated with multiple frequency offsets from a reference frequency of a magnetization excitation pulse.

For example, the multiple MRI images may be obtained from the MRI scanner of FIG. 1 or a database, such as a PACS. The multiple MRI images may be obtained from a frequency scout scan using the same SSFP pulse sequence with varying frequency offsets of a magnetization excitation pulse, e.g., ±0.5 Hz, ±1.0 Hz, ±1.5 Hz, . . . , from a 128 MHz magnetization excitation pulse. The total number of the frequency offsets used in the frequency scout measurement may be 20-50, 200-500, or even more than 1,000. There is a tendency that the higher the number of frequency offsets, the more precise the optimal frequency offset.

At block 1020, at least one reference image is determined from the multiple MRI images based on spectrum information of each of the multiple MRI images.

Depending on the scenario, a single reference image or two or more reference images may be determined.

The spectrum information may pertain, as a general rule, to spatial frequency components of the MRI images. According to this disclosure, the spectrum information may represent how quickly/slowly the pixels of an MRI image change in contrast in both the x and y spatial dimensions. If the multiple MRI images obtained at block 1010 are k-space images, the spectrum information can be obtained from the multiple MRI images themselves, i.e., information comprised in k-space. If the multiple MRI images obtained at block 1010 are in image domain, e.g., x-y domain, the spectrum information can be obtained by applying the Fourier transformation to each one of the multiple MRI images, i.e., k-space images.

According to various examples, the spectrum information of each of the multiple MRI images may comprise a high-frequency signal contribution which may be determined based on applying a high-pass filter to each of the multiple MRI images. Alternatively or additionally, the spectrum information of each of the multiple MRI images may be determined based on applying a low-pass filter to each of the multiple MRI images. Such a high-pass filter or a low-pass filter may be those defined associated with conventional programming languages, e.g., C++, Python, or Matlab. The cutoff frequency of either the high-frequency filter or the low-pass filter may be the same.

Specifically, according to the disclosure, the spectrum information may quantify a high-frequency signal contribution. I.e., a high pass filter may be applied to the k-space representation of each MRI image (e.g., selectively in the ROI), and the remaining post-filter pixel values can be summed.

The high-frequency signal contribution could be determined as follows: an MRI image is Fourier transformed to k-space. Then, the total signal at high spatial frequencies beyond a predetermined threshold can be determined by integration of the respective image values in k-space, for one or two of the k-space directions.

The method may include determining, from the multiple MRI images, a subset including two or more MRI images based on the spectrum information of each of the multiple MRI images, and the at least one reference image is determined based on the subset of the two or more MRI images. For example, the two or three images respectively having the smallest high-frequency components (e.g., specifically in the ROI) if compared to the other MRI images can be included in the subset.

Then, the at least one reference image is determined based on the subset.

For instance, where two or three or more MRI images are included in the subset, a single reference image may be determined based on a pixel-wise average of the MRI images in the subset. Another combination would be possible, e.g., weighted average wherein the weighting factors are derived from the high-frequency components.

According to this disclosure, the two or more MRI images included in the subset may have a minimum high-frequency signal contribution.

In another scenario, all MRI images in the subset may be retained as reference images (then yielding more than a single reference image).

At block 1030, a respective similarity measure is determined for each MRI image based on a comparison between the at least one reference image and each one of the multiple MRI images.

For example, the similarity measures may be determined based on the disclosure related to structural similarity of non-patent literature—Wang, Zhou, et al. "Image quality assessment: from error visibility to structural similarity." IEEE transactions on image processing 13.4 (2004): 600-612.

For example, the similarity measures can be determined using a trained machine learning algorithm, for example, the Deep Learning-guided Adaptive Weighted Averaging algorithm disclosed in a non-patent literature—Gadjimuradov, Fasil, et al. "Deep learning-guided weighted averaging for signal dropout compensation in diffusion-weighted imaging of the liver." arXiv preprint arXiv:2202.09912 (2022).

In one scenario, the trained machine learning algorithm can determine a similarity score for each pair of input images, i.e., a given reference image and a given MRI image. For instance, respective training data may be generated manually by an expert, assigning respective similarity scores as ground truth.

For instance, the trained machine learning algorithm may generate a respective weighting map for each one of the multiple MRI images, and the respective weighting map may penalize signal deviations from a pixel-wise median that is calculated based on the at least one reference image, and the respective similarity measure may be determined based on the respective weighting map.

If a single reference image is determined at block 1020, then a similarity measure is determined between each one of the MRI images and the single reference image.

If multiple reference images are determined at block 1020, for example, three reference images are determined from twelve MRI images, i.e., twelve MRI images are obtained at block 1010, then based on each of the three reference images, a respective partial similarity measure may be determined for each of the twelve MRI images. In total, 36 partial similarity measures are obtained. Then, to yield the (final) similarity measure for a given MRI image, the partial similarity measures can be combined, e.g., average, for each MRI image.

At block 1040, a frequency offset for a subsequent MRI scan is selected from the multiple frequency offsets based on the similarity measures.

For example, the selecting of the frequency offset for the subsequent MRI scan may comprise selecting a given MRI image from the multiple MRI images which is associated with the maximum similarity measure, and the given MRI image is acquired in the frequency scout measurement using the selected frequency offset. For example, during the frequency scout scan, 100 frequency offsets are used, and the MRI image obtained using the frequency offset 26 Hz has the maximum similarity measure according to block 1030. Thus, the frequency offset 26 Hz is selected as the frequency offset for performing the subsequent MRI scan.

According to various examples, artifacts occurring in a specific position of the multiple MRI images may be relevant for clinical practice, e.g., in a part of the multiple MRI images which respectively depicts a heart of a patient. Thus, to further facilitate a more precise selection of the frequency offset for the subsequent MRI scan, the method 1000 may further comprise determining a ROI of each of the multiple MRI images, and the spectrum information of each of the multiple MRI images is associated with the ROI. The spectrum information may be determined only based on information included in the ROI or the ROI may be weighted higher than the surrounding.

For example, the ROI may be determined based on segmentation techniques according to either classical computer vision approaches or artificial-intelligence-based (AI-based) approaches, e.g., a trained segmentation machine learning algorithm for segmenting the ROI from at least one of the multiple MRI images. In general, the multiple MRI images obtained from frequency scout measurements associated with multiple frequency offsets depict the same anatomy, and thereby the ROI in each of the multiple MRI images may be the same. Thus, as far as the ROI in a single MRI image is determined/segmented, the respective ROI in the other MRI images may be determined, e.g., by applying the same spatial position, e.g., coordinate pairs in the x-y domain/plane, of the determined ROI in the single MRI image. Alternatively, it is also possible to determine the ROI from each of the multiple MRI images, e.g., using the same segmentation techniques.

According to various examples, the similarity measures may be determined based on comparisons that are restricted to the ROI. For instance, for a given reference image and a given MRI image, the similarity measure of the given MRI image is determined based on a comparison between the ROI of the reference image and the ROI of the given MRI image. The surrounding of the ROI may be neglected.

By considering the ROI, it can be ensured that artifacts do not occur in the clinically-relevant regions. Artifacts can be pushed to other, less relevant regions in the surrounding of the ROI.

According to various examples, the subsequent MRI scan may be based on an SSFP pulse sequence or a bSSFP pulse sequence using the determined frequency offset. Thus, the method 1000 may further comprise configuring the MRI scanner 100 of FIG. 1, e.g., the pulse sequence electronics 140, to generate the SSFP pulse sequence or the bSSFP pulse sequence using the determined frequency offset.

According to this disclosure, the method 1000 may facilitate performing a subsequent MRI scan which comprises at least one of a cardiac imaging scan, a fetal imaging scan, and an abdominal imaging scan.

According to the method 1000, the frequency offset for a subsequent MRI scan may be selected from the multiple frequency offsets based on the similarity measures which respectively characterize how similar each one of the multiple MRI images is to the at least one reference image, and thereby the optimal offset for a subsequent MRI scan can be selected. Such a selection can be automatically performed using a computing device, such as the image reconstruction electronics 150 and/or the pulse sequence electronics 140 of the MRI scanner of FIG. 1, or a personal computer, a server, or a workstation. Thus, the number of frequency offsets per hertz (Hz) used in the frequency scout measurement can be increased greatly, and thereby the optimal frequency offset can be determined more precisely, reliably, and efficiently compared to being manually selected by a medical expert. Further, the waiting time for a patient in between the scout scan and the subsequent MRI scan may be considerably reduced and thereby patient experience can be improved.

Figure 3:
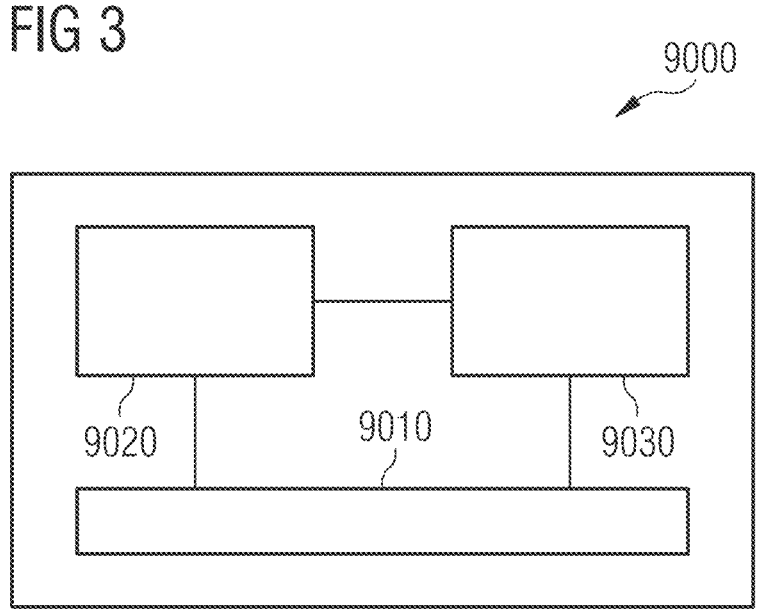
FIG. 3 schematically illustrates a block diagram of a computing device according to various examples.

FIG. 3 is a block diagram of a computing device 9000 according to various examples. The computing device 9000 may comprise a processor 9020, a memory 9030, and an input/output interface 9010. The processor 9020 is configured to load program code from the memory 9030 and execute the program code. Upon executing the program code, the processor 9020 performs the method 1000 for determining/selecting a frequency offset for a subsequent MRI scan.

Referring to FIG. 1 again, the MRI scanner 100 may further comprise the computing device 9000 configured to perform the method 1000. The computing device 9000 may be the image reconstruction electronics 150 and/or the pulse sequence electronics 140. I.e., the computing device 9000 may be embedded in or connected with the MRI scanner 100, and thereby the MRI scanner 100 may be also configured to perform the method 1000.

Summarizing, techniques have been described that facilitate automatically determining/selecting an optimal frequency offset for a subsequent MRI scan, in particular, for an SSFP or a bSSFP pulse sequence. By using the determined/selected optimal frequency offset, banding artifacts and/or flow-related artifacts can be reduced. Further, by using the automatically determining/selecting techniques, the number of frequency offsets per hertz (Hz) used in the frequency scout scan can be increased greatly, and thereby the optimal frequency offset can be determined more precisely, reliably, and efficiently compared to being manually selected by a medical expert. Further, the waiting time for a patient in between the scout scan and the subsequent MRI scan may be considerably reduced and thereby patient experience can be improved. In addition, the optimal frequency offset may be determined for a specific ROI but not the whole MRI image, which may further facilitate the reduction of artifacts occurred in a specific ROI.

Although the disclosure has been shown and described with respect to certain preferred embodiments, equivalents and modifications will occur to others skilled in the art upon the reading and understanding of the specification. The present disclosure includes all such equivalents and modifications and is limited only by the scope of the appended claims.

For illustration, an image domain similarity measure between the at least one reference image and the MRI images has been disclosed. It would also be possible that the similarity measure is determined at least partly based on spectrum information.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

We claim:

1. A computer-implemented method, comprising:
    obtaining multiple magnetic resonance imaging (MRI) images, wherein the multiple MRI images are obtained from frequency scout measurements associated with multiple frequency offsets from a reference frequency of a magnetization excitation pulse;
    determining, from the multiple MRI images, at least one reference image based on spectrum information of each of the multiple MRI images;
    determining, for each respective MRI image of the multiple MRI images, a respective similarity measure based on a comparison between the at least one reference image and the respective MRI image; and
    selecting, based on the similarity measures, a frequency offset for a subsequent MRI scan from the multiple frequency offsets.

2. The method of claim 1, wherein said selecting of the frequency offset for the subsequent MRI scan comprises:
    Selecting, from the multiple MRI images, a MRI image associated with a maximum similarity measure, wherein
        the MRI image is acquired in a frequency scout measurement using the selected frequency offset.

3. The method of claim 1, further comprising:
    determining the similarity measures using a trained machine learning algorithm.

4. The method of claim 3, further comprising:
    generating, via the trained machine learning algorithm, a respective weighting map for each of the multiple MRI images, the respective weighting map penalizing signal deviations from a pixel-wise median that is calculated based on the at least one reference image, and wherein the respective similarity measure is determined based on the respective weighting map.

5. The method of claim 1, further comprising:
    determining a region of interest (ROI) of each of the multiple MRI images, wherein
        the spectrum information of each of the multiple MRI images is associated with the ROI.

6. The method of claim 5, wherein said determining of the ROI is based on a trained segmentation machine learning algorithm for segmenting the ROI from at least one of the multiple MRI images.

7. The method of claim 5, wherein the comparison is restricted to the ROI.

8. The method of claim 1, further comprising:
    determining, from the multiple MRI images, a subset of the multiple MRI images based on the spectrum information of each of the multiple MRI images, the subset including two or more MRI images, wherein
        the at least one reference image is determined based on the two or more MRI images.

9. The method of claim 8, wherein said determining of the at least one reference image comprises:
    averaging the two or more MRI images.

10. The method of claim 1, further comprising:
    applying a high-pass filter to each of the multiple MRI images, wherein
        the spectrum information of each of the multiple MRI images includes a high-frequency signal contribution determined based on said applying of the high-pass filter.

11. The method of claim 8, wherein the two or more MRI images have a minimum high-frequency signal contribution.

12. The method of claim 1, wherein the subsequent MRI scan is based on a steady-state free precession pulse sequence using the selected frequency offset.

13. The method of claim 1, wherein the subsequent MRI scan is one of a cardiac imaging scan, a fetal imaging scan, or an abdominal imaging scan.

14. A computing device comprising:
at least one processor; and
a memory storing program code that, when executed at the at least one processor, causes the computing device to perform the method of claim 1.

15. An MRI scanner comprising the computing device of claim 14.

16. The method of claim 2, further comprising:
determining the similarity measures using a trained machine learning algorithm.

17. The method of claim 16, further comprising:
generating, via the trained machine learning algorithm, a respective weighting map for each of the multiple MRI images, the respective weighting map penalizing signal deviations from a pixel-wise median that is calculated based on the at least one reference image, and wherein the respective similarity measure is determined based on the respective weighting map.

18. The method of claim 2, further comprising:
determining a region of interest (ROI) of each of the multiple MRI images, wherein
the spectrum information of each of the multiple MRI images is associated with the ROI.

19. The method of claim 6, wherein the comparison is restricted to the ROI.

20. The method of claim 9, wherein the two or more MRI images have a minimum high-frequency signal contribution.

* * * * *